Jan. 15, 1929.

H. P. MASSEY

AIRCRAFT

Filed Feb. 25, 1925  3 Sheets-Sheet 1

1,698,819

Inventor
Henry P. Massey
By his Attorneys
Ward, Crosby & Smith

Jan. 15, 1929.
H. P. MASSEY
AIRCRAFT
Filed Feb. 25, 1925
1,698,819
3 Sheets-Sheet 2
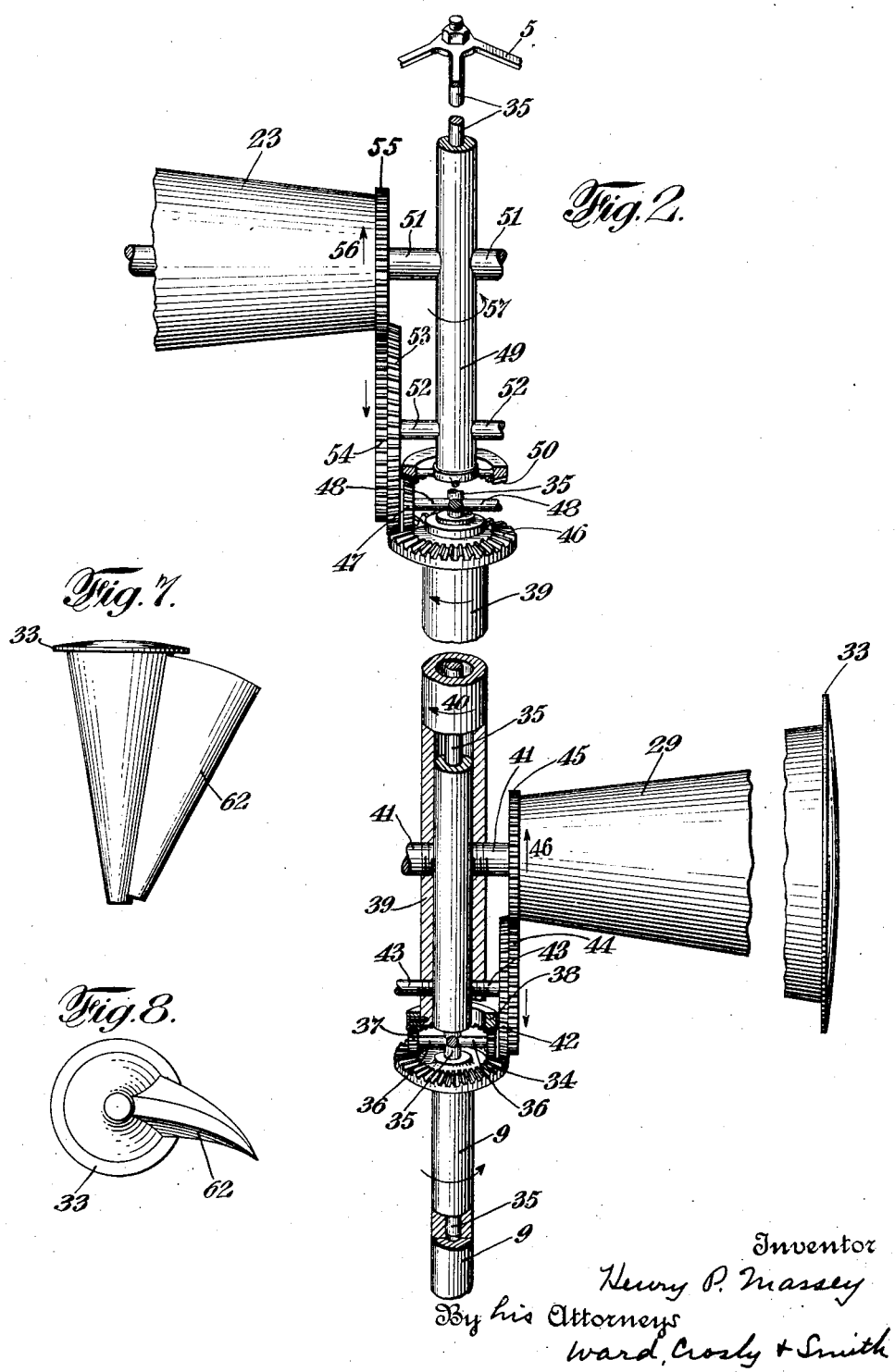
Inventor
Henry P. Massey
By his Attorneys
Ward, Crosby & Smith Jan. 15, 1929.  H. P. MASSEY  1,698,819
AIRCRAFT
Filed Feb. 25, 1925    3 Sheets-Sheet 3
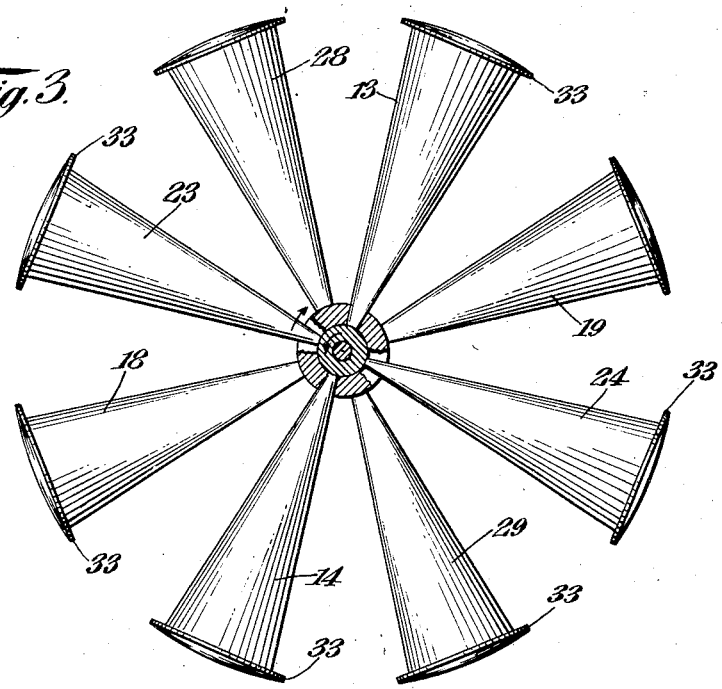
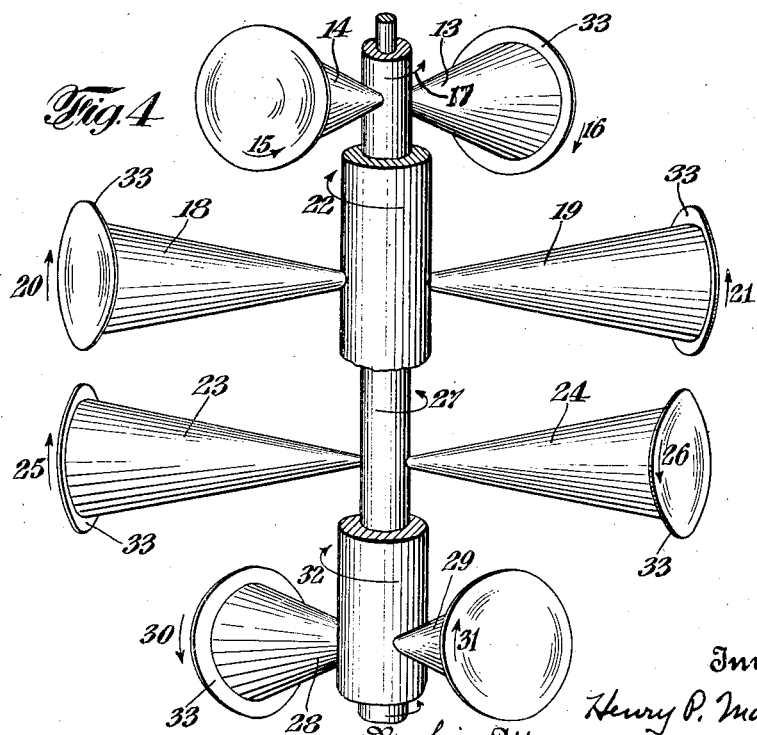
Inventor
Henry P. Massey
By his Attorneys
Ward Crosby & Smith Patented Jan. 15, 1929.

1,698,819

UNITED STATES PATENT OFFICE.

HENRY P. MASSEY, OF NEW YORK, N. Y.

AIRCRAFT.

Application filed February 25, 1925. Serial No. 11,394.

My invention relates to improvements in aircraft and especially to helicopters. The main object of the invention is to provide a new and improved arrangement for producing a lifting effect in such aircraft. Further and more specific objects, features and advantages will more clearly appear from the detailed description below taken in connection with the accompanying drawings which form a part of this specification.

Figure 1:
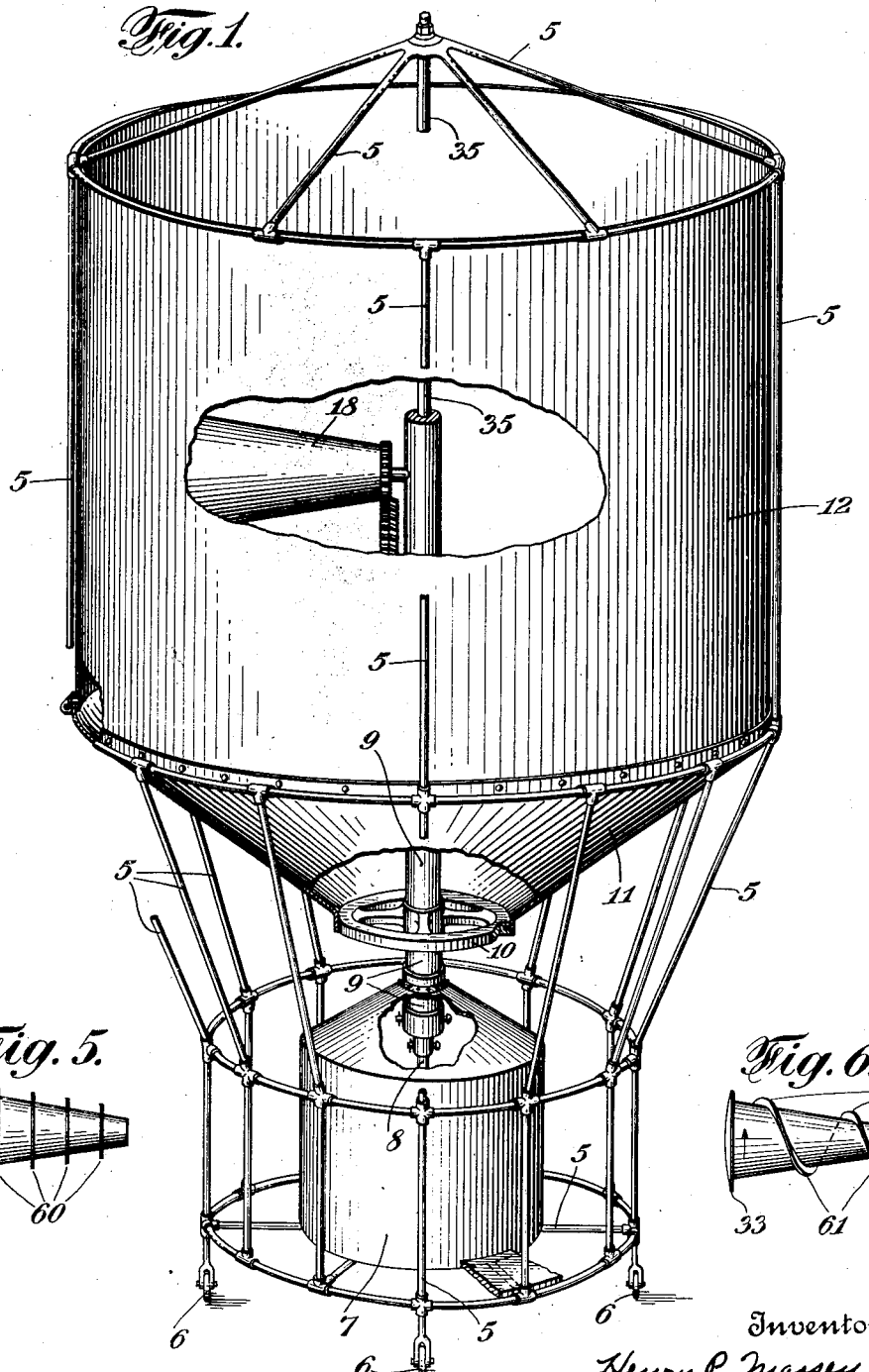
Figure 5:
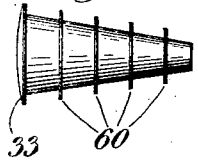
Figure 6:
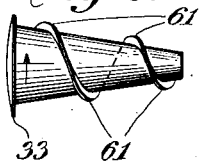

In the drawings, Fig. 1 is a perspective of a helicopter embodying my improvements in one form, various parts being broken away and omitted for the sake of clearness. Fig. 2 is a perspective, partly in section, of certain internal mechanism used in the arrangement shown in Fig. 1. Fig. 3 is a diagrammatic plan view illustrating one arrangement of the rotating bodies and Fig. 4 is an elevation of the same, various parts being broken away or shown in section for the sake of clearness. Figs. 5, 6 and 7 are plan views illustrating modifications. Fig. 8 is an end view of parts shown in Fig. 7. All the drawings are more or less diagrammatical in order that the improvements may be more clearly illustrated.

Referring to Fig. 1, the helicopter there shown is provided with a suitable frame work 5, having on the bottom thereof wheels 6, and supporting a chamber 7 in which is located the engine, motor or other suitable source of power, which drives a shaft 8 which in turn rotates about a vertical axis a sleeve shaft 9, having a bearing in the frame piece 10 secured in the bottom opening of a conical bottom 11 of a casing 12 rigidly secured to and carried by the frame work 5. The casing 12 is cylindrical in shape and open at its top end.

Within the casing are arranged a plurality of rotating bodies, arranged for example as shown in Figs. 3 and 4. Referring to Figs. 3 and 4 there are shown a set of two horizontally arranged conical bodies 13 and 14. By any suitable means (not shown in Figs. 3 and 4) these are rotated about their horizontal axes as indicated by the arrows 15 and 16 in Fig. 4. They are also rotated in a horizontal plane about a vertical axis adjacent the small ends of the cones as indicated by the arrow 17 in Fig. 4. Below the bodies 13 and 14 is another set of horizontally arranged conical bodies 18 and 19. By any suitable means (not shown in Figs. 3 and 4) these are rotated about their horizontal axes as indicated by the arrows 20 and 21 in Fig. 4. They are also rotated in a horizontal plane about a vertical axis adjacent the small ends of the cones as indicated by the arrow 22 in Fig. 4. Below the bodies 18 and 19 is another set of horizontally arranged conical bodies 23 and 24. By any suitable means (not shown in Figs. 3 and 4) these are rotated about their horizontal axes as indicated by the arrows 25 and 26 in Fig. 4. They are also rotated in a horizontal plane about a vertical axis adjacent the small ends of the cones as indicated by the arrow 27 in Fig. 4. Below the bodies 23 and 24 is another set of horizontally arranged conical bodies 28 and 29. By any suitable means (not shown in Figs. 3 and 4) these are rotated about their horizontal axes as indicated by the arrows 30 and 31 in Fig. 4. They are also rotated in a horizontal plane about a vertical axis adjacent the small ends of the cones as indicated by the arrow 32 in Fig. 4.

It will, therefore, appear that there are provided a plurality of sets of horizontally extending rotating bodies each circular in vertical cross section, one set above the next, each of said bodies being rotated about a horizontal axis and also about a vertical axis, one rotating about the vertical axis in one direction and the next set rotating about the vertical axis in the opposite direction, and each of the bodies rotating about its horizontal axis in a direction such that the air currents which tend to be set up by the frictional contact of the air with the conical surfaces of the bodies, act to oppose the rotation in the horizontal planes, on the underneath side of the bodies and aid the same on the top side of the bodies, whereby an increase of air pressure is produced on the underneath side of said bodies and a diminution of air pressure is produced on the top sides of said bodies. That is, there will result because of the skin friction between conical surfaces and the air an increase in the velocity of the air over the tops of the rotating bodies and a decrease in the velocity of the air passing over the bottoms of the bodies, which results in an increase in air pressure underneath the bodies and a decrease in air pressure on top of the bodies, thereby producing a substantial lifting effect to cause the helicopter to take flight substantially vertically upward. Each of the rotating conical bodies is preferably hollow and made of thin aluminum for lightness in weight and is closed at both ends and provided with a peripheral vertical flange 33 at its outer end to better confine the air currents on the surfaces of the rotating body.

While any suitable means of driving and rotating the rotating bodies may be employed, one method is illustrated in Fig. 2 wherein the hollow drifting shaft 9 connected to the source of power as before mentioned has secured thereto a bevel gear 34. 35 represents a rod rigidly secured to the frame work 5 at the top and extending centrally down into the hollow shaft or sleeve 9 nearly to the bottom thereof and serving as a bearing therefor. Rigidly secured to the rod 35 are arms 36 on which are journalled gears 37 meshing with the gear 34 so that the gears 37 are rotated thereby while the arms 36 are held stationary. The gears 37 also mesh with a gear 38 rigidly secured to a sleeve 39 whereby the sleeve is rapidly rotated in the direction of the arrow 40. Rigidly secured to the sleeve 39 are arms 41 on which are journalled the rotating bodies 28 and 29, whereby the bodies 28 and 29 are rapidly rotated in a horizontal plane about a vertical axis. The gear 34 also meshes with gears 42 journalled on arms 43 rigidly secured to the sleeve 39. Since the gear 34 rotates in the opposite direction the gears 42 are rotated at twice the speed. The gears 42 have rigidly secured thereto gears 44 meshing with gears 45 rigid with the conical bodies 28 and 29 respectively whereby the conical bodies 28 and 29 are rotated about their horizontal axes with extreme rapidity in the direction indicated by the arrow 46.

The rotating sleeve 39 has rigidly secured thereto a gear 46 which meshes with gears 47 journalled on arms 48 rigidly secured to the rod 35. 49 represents a hollow shaft or sleeve rotatably mounted on the rod 35 and having rigidly secured thereto a gear 50 meshing with the gears 47 whereby the shaft 49 is rotated about a vertical axis in a direction opposite to that of the sleeve 39. The sleeve 49 has arms 51 rigidly secured thereto on which are journalled the conical bodies 23 and 24. The sleeve 49 also has arms 52 rigidly secured thereto and journalled on the arms 52 are gears 53 meshing with the gear 46. Gears 54 rigidly secured to the gears 53 respectively mesh with gears 55 rigidly secured to the conical bodies 23 and 24 whereby the bodies 23 and 24 are rigidly rotated about their horizontal axes in the direction indicated by the arrow 56 and at the same time are rotated about a vertical axis as indicated by the arrow 57.

And so on, the bodies 18 and 19 are rotated about the vertical axis in the opposite direction from the bodies 23 and 24 and the bodies 14 and 13 are rotated about the vertical axis in the opposite direction from the bodies 18 and 19 by similar sets of gears and all the bodies are rotated at greater speed about their horizontal axes and in a direction to increase the velocity of the air over the tops of the bodies and decrease the velocity of the air underneath the bodies.

Since there is produced decrease in pressure over the tops of the rotating bodies and an increase in pressure underneath the same, the air is forced downward since it cannot escape laterally because of the surrounding casing 12. That is, the casing 12 serves to increase the density of the air, assist in its compression and cause the air to flow through the outlet or opening in the bottom of the casing. Since the bottom of the casing is tapered and the opening therethrough smaller than at the top, the air pressure will be greatly increased relatively to the surrounding air and thus contribute to the lifting effect. The casing 12 is preferably made of thin sheet aluminum while the frame work 5 is preferably made of aluminum pipe rods. It will be noted that the different sets of rotating bodies are staggered with respect to one another in order to get maximum effect. Each rotating body may, if desired, be provided with a series of peripheral flanges as indicated at 60—60 in Fig. 5 to better concentrate the pressure variations. Or if desired they may be provided with a helical peripheral flange as indicated at 61 in Fig. 6. Also the various rotating bodies may be provided with trailing air foils carried by the horizontal arms about which the rotating bodies rotate, such air foils being indicated by 62 in Figs. 7 and 8. By this arrangement there is produced a relative increase in velocity of air over the top of the air foils and thereby producing a relative decrease in pressure of the air above the air foils while a relative increase in pressure is produced underneath the air foils producing a lifting effect through air foils.

While I have described my improvements in great detail and with respect to certain particular forms, I do not desire to be limited to such details or forms since many changes and modifications may be made and the invention embodied in widely different forms without departing from the spirit and scope thereof in its broader aspect. Hence I desire to cover all modifications and forms coming within the language or scope of any one or more of the appended claims.

What I claim as new and desire to secure by Letters Patent is:

1. A helicopter having a plurality of sets of horizontally extending bodies, one set rotating about a vertical axis in one direction and another set rotating about a vertical axis in the opposite direction, said bodies also rotating about horizontal axes.

2. An aircraft having as a means for producing a lifting effect thereon, a body rotating about a horizontal axis and also about a vertical axis, said body being of general conical shape with the smaller end thereof adjacent the vertical axis and the larger end thereof away from the vertical axis.

3. A helicopter having a plurality of sets of horizontally extending bodies, one set rotating about a vertical axis in one direction and another set rotating about a vertical axis in the opposite direction, said bodies also rotating about horizontal axes, said bodies being of general conical shape with the smaller ends thereof adjacent the vertical axis and the larger ends thereof away from the vertical axis.

4. An aircraft having as a means for producing a lifting effect thereon, a body rotating about a horizontal axis and also about a vertical axis, said body at its outer end away from the vertical axis being provided with a peripheral flange.

5. A helicopter having a plurality of sets of horizontally extending bodies, one set rotating about a vertical axis, in one direction and another set rotating about a vertical axis in the opposite direction, said bodies also rotating about horizontal axes, and said bodies being provided with peripheral flanges.

6. A helicopter having a plurality of sets of horizontally extending bodies, one set rotating about a vertical axis in one direction and another set rotating about a vertical axis in the opposite direction, said bodies also rotating about horizontal axes, said bodies being of general conical shape with the smaller ends thereof adjacent the vertical axis and the larger ends thereof away from the vertical axis and said bodies being provided with peripheral flanges.

7. An aircraft having as a means for producing a lifting effect thereon, a body rotating about a horizontal axis and also about a vertical axis, and a relatively stationary casing surrounding said body at the sides, said casing being provided with top and bottom openings.

8. A helicopter having a plurality of horizontally arranged bodies rotating about their horizontal axes and also rotating about a vertical axis, and a relatively stationary casing surrounding said bodies at the sides, said casing being provided with top and bottom openings.

9. A helicopter having a plurality of sets of horizontally extending bodies, one set rotating about a vertical axis in one direction and another set rotating about a vertical axis in the opposite direction, said bodies also rotating about horizontal axes, and a relatively stationary casing surrounding said bodies at the sides, said casing being provided with top and bottom openings.

10. A helicopter having a plurality of sets of horizontally extending bodies, one set rotating about a vertical axis in one direction and another set rotating about a vertical axis in the opposite direction, said bodies also rotating about horizontal axes, said bodies being of general conical shape with the smaller ends thereof adjacent the vertical axis and the larger ends thereof away from the vertical axis and a relatively stationary casing surrounding said bodies at the sides, said casing being provided with top and bottom openings.

11. A helicopter having a plurality of sets of horizontally extending bodies, one set rotating about a vertical axis in one direction and another set rotating about a vertical axis in the opposite direction, said bodies also rotating about horizontal axes, said bodies being of general conical shape with the smaller ends thereof adjacent the vertical axis and the larger ends thereof away from the vertical axis, and said bodies being provided with peripheral flanges, and a relatively stationary casing surrounding said bodies at the sides, said casing being provided with top and bottom openings.

12. A helicopter having a plurality of sets of horizontally extending bodies, one set rotating about a vertical axis in one direction and another set rotating about a vertical axis in the opposite direction, said bodies also rotating about horizontal axes, and one set being underneath another and the directions of rotation being such that an increase in air pressure is produced underneath said bodies and a decrease in air pressure is produced on top of said bodies.

13. A helicopter having a plurality of sets of horizontally extending bodies, one set rotating about a vertical axis in one direction and another set rotating about a vertical axis in the opposite direction, said bodies also rotating about horizontal axes, said bodies being of general conical shape with the smaller ends thereof adjacent the vertical axis and the larger ends thereof away from the vertical axis, and one set being underneath another and the directions of rotation being such that an increase in air pressure is produced underneath said bodies and a decrease in air pressure is produced on top of said bodies, and said bodies being provided with peripheral flanges, and a relatively stationary casing surrounding said bodies at the sides, said casing being provided with top and bottom openings.

14. A helicopter having a plurality of sets of horizontally extending bodies, one set rotating about a vertical axis in one direction and another set rotating about a vertical axis in the opposite direction, said bodies also rotating about horizontal axes and air foils trailing said rotating bodies respectively and rotating therewith in the horizontal planes in which they rotate respectively.

15. A helicopter having a plurality of sets of horizontally extending bodies, one set rotating about a vertical axis in one direction and another set rotating about a vertical axis in the opposite direction, said bodies also rotating about horizontal axes, said bodies being of general conical shape with the smaller ends thereof adjacent the vertical axis and the larger ends thereof away from the vertical axis, and a relatively stationary casing surrounding said bodies at the sides, said casing being provided with top and bottom openings, and air foils trailing said rotating bodies respectively and rotating therewith in the horizontal planes in which they rotate respectively.

16. An air craft having as a means for producing a lifting effect thereon, a set of rotating conical bodies, said set rotating about a vertical axis and each of said conical bodies rotating about a horizontal axis in a direction such that an increase in pressure is produced underneath, and said conical bodies having their smaller ends relatively adjacent the vertical axis of rotation of the set and their larger ends further away from the vertical axis of rotation of the set.

17. An aircraft having as a means for producing a lifting effect thereon, a horizontally extending body substantially circular in vertical cross section and rotating about a horizontal axis and also about a vertical axis and an air foil trailing said rotating body and rotating therewith about the said vertical axis.

18. An aircraft having as a means for producing a lifting effect thereon, a horizontally extending body substantially circular in vertical cross section and rotating about a horizontal axis and also about a vertical axis and an air foil trailing said rotating body and rotating therewith in a horizontal plane.

In testimony whereof I have signed my name to this specification.

HENRY P. MASSEY.